US012755120B2

(12) United States Patent
Larroudé

(10) Patent No.: US 12,755,120 B2
(45) **Date of Patent: *Oct. 6, 2026**

(54) SYSTEMS AND METHODS FOR DELIVERING TARGETED BENEFITS TO MOBILE DEVICES

(71) Applicant: Larroudé Inc., New York, NY (US)

(72) Inventor: Ricardo Larroudé, New York, NY (US)

(73) Assignee: Larroudé Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,563

(22) Filed: Dec. 30, 2024

(65) Prior Publication Data

US 2025/0209493 A1 Jun. 26, 2025

Related U.S. Application Data

(63) Continuation of application No. 18/608,384, filed on Mar. 18, 2024, now Pat. No. 12,243,071, which is a
(Continued)

(51) Int. Cl.
*G06Q 30/00* (2023.01)
*G06K 7/10* (2006.01)
(Continued)

(52) U.S. Cl.
CPC ..... *G06Q 30/0236* (2013.01); *G06K 7/10297* (2013.01); *G06K 7/1417* (2013.01);
(Continued)

(58) Field of Classification Search
CPC ............. G06Q 30/0236; G06Q 10/087; G06Q 30/0214; G06Q 30/0224; G06Q 30/0641;
(Continued)

(56) References Cited

U.S. PATENT DOCUMENTS 9,792,597 B1 10/2017 Jen et al.
12,243,071 B1 3/2025 Larroudé
(Continued)

FOREIGN PATENT DOCUMENTS

WO WO-2013126382 A1 8/2013

OTHER PUBLICATIONS

U.S. Appl. No. 17/534,188 Office Action dated Feb. 1, 2023.
(Continued)

*Primary Examiner* — Meredith A Long
(74) *Attorney, Agent, or Firm* — WILSON SONSINI GOODRICH & ROSATI

(57) ABSTRACT

The present disclosure provides systems and methods for registering and tracking items. In an aspect, the present disclosure provides a method for registering and tracking items. The method may comprise (a) providing one or more identifying features corresponding to one or more items, wherein the identifying features comprise product information for the one or more items; (b) registering the identifying features with one or more initial consumers after the one or more initial consumers scan the identifying features; and (c) providing one or more subsequent consumers with access to an online platform for purchasing the one or more items when the one or more subsequent consumers scan the identifying features associated with the one or more items and the one or more initial consumers.

20 Claims, 5 Drawing Sheets

Related U.S. Application Data continuation of application No. 17/534,188, filed on Nov. 23, 2021, now abandoned.

(60) Provisional application No. 63/117,770, filed on Nov. 24, 2020.

(51) Int. Cl.

| | |
|---|---|
| ***G06K 7/14*** | (2006.01) |
| ***G06K 19/04*** | (2006.01) |
| ***G06K 19/06*** | (2006.01) |
| ***G06Q 10/087*** | (2023.01) |
| ***G06Q 30/0207*** | (2023.01) |
| ***G06Q 30/0214*** | (2023.01) |
| ***G06Q 30/0601*** | (2023.01) |

(52) U.S. Cl.

CPC ..... *G06K 19/045* (2013.01); *G06K 19/06037* (2013.01); *G06Q 10/087* (2013.01); *G06Q 30/0214* (2013.01); *G06Q 30/0224* (2013.01); *G06Q 30/0641* (2013.01)

(58) Field of Classification Search

CPC .. G06Q 50/01; G06K 7/10297; G06K 7/1417; G06K 19/045; G06K 19/06037

See application file for complete search history.

(56) References Cited

U.S. PATENT DOCUMENTS

| | | | |
|---|---|---|---|
| 2007/0299728 A1 | 12/2007 | Nemirofsky et al. | |
| 2008/0320004 A1 | 12/2008 | Jain et al. | |
| 2013/0103537 A1 | 4/2013 | Hewett | |
| 2013/0138491 A1 | 5/2013 | Gao et al. | |
| 2014/0019225 A1 | 1/2014 | Guminy et al. | |
| 2014/0095293 A1* | 4/2014 | Abhyanker | H04L 67/306 705/319 |
| 2014/0195316 A1 | 7/2014 | Vorotyntsev et al. | |
| 2014/0351030 A1 | 11/2014 | Priebatsch | |
| 2015/0081443 A1* | 3/2015 | Davis | G06Q 30/0251 705/14.58 |
| 2015/0127439 A1 | 5/2015 | Campos De Figueiredo Faceira et al. | |
| 2015/0154624 A1 | 6/2015 | Torabi | |
| 2015/0341225 A1 | 11/2015 | Baarman et al. | |
| 2016/0072820 A1 | 3/2016 | Shaffer | |
| 2016/0086211 A1 | 3/2016 | Lynn | |
| 2016/0180371 A1 | 6/2016 | Deng | |
| 2017/0132688 A1 | 5/2017 | Freund et al. | |
| 2017/0161710 A1* | 6/2017 | Su | H04L 51/222 |
| 2018/0150870 A1 | 5/2018 | Haaland | |
| 2018/0189526 A1* | 7/2018 | Costa Botey | G06K 7/10297 |
| 2019/0050911 A1 | 2/2019 | Fuller et al. | |
| 2020/0184301 A1 | 6/2020 | Chamandy | |
| 2020/0357080 A1 | 11/2020 | Bogaard et al. | |
| 2021/0142425 A1* | 5/2021 | Rossi | G06Q 30/0201 |
| 2021/0365969 A1 | 11/2021 | Lieu et al. | |

OTHER PUBLICATIONS

U.S. Appl. No. 17/534,188 Office Action dated Sep. 19, 2023.
U.S. Appl. No. 17/534,188 Office Action dated Sep. 28, 2024.
U.S. Appl. No. 18/608,384 Notice of Allowance dated Nov. 6, 2024.
U.S. Appl. No. 18/608,384 Office Action dated May 16, 2024.

* cited by examiner

SYSTEMS AND METHODS FOR DELIVERING TARGETED BENEFITS TO MOBILE DEVICES

CROSS-REFERENCE TO RELATED APPLICATIONS

The present application is a continuation of U.S. application Ser. No. 18/608,384, filed Mar. 18, 2024, which is a continuation of U.S. application Ser. No. 17/534,188, filed Nov. 23, 2021, which claims the benefit of U.S. Provisional Application No. 63/117,770, filed Nov. 24, 2020, each of which is incorporated by reference herein in its entirety.

BACKGROUND

Consumers may buy products or items in brick-and-mortar stores, through online retailers or distributors, or through consumer-to-consumer transactions that may occur in person or online. Although some consumers may buy products or items based on their specific needs or use cases, many consumers may also buy certain products or items based on advertisements and exposure to other consumers who may have already purchased a same or similar product or item.

SUMMARY

The present application relates generally to product sales, advertisement, and marketing, and more particularly, to systems and methods for tracking product sales and/or consumer influence using one or more identifying features that are (i) associated with consumer products and (ii) registered to consumers who have purchased, received, or used such consumer products. The systems and methods of the present disclosure provide certain benefits and advantages over other conventional systems and methods by enabling the use of identifying features (e.g., QR codes) for product marketing, new customer acquisition, and/or product sales and distribution modeling. In some cases, the systems and methods of the present disclosure may be implemented to identify influential consumers and other live marketers who can generate or build up new customer acquisition channels.

In one aspect, the present disclosure provides a method for registering and tracking items. The method may comprise (a) providing one or more identifying features corresponding to one or more items, wherein the identifying features comprise product information associated with the one or more items; (b) registering the identifying features with one or more initial consumers after the one or more initial consumers scan the identifying features; and (c) providing one or more subsequent consumers with access to an online platform for customizing or purchasing the one or more items when the one or more subsequent consumers scan the identifying features associated with the one or more items and the one or more initial consumers.

In some embodiments, the method may further comprise providing one or more rewards, incentives, or benefits to the one or more initial consumers after the one or more subsequent consumers scan the identifying features and purchase an item using the online platform. In some embodiments, the one or more rewards, incentives, or benefits comprise a discount, a voucher, or virtual points.

In some embodiments, the method may further comprise: generating item sales tracking data based on the scanning of the identifying feature by the one or more subsequent consumers. In some embodiments, the item sales tracking data comprises information on item sales or consumer influence within a consumer group, a geographical area, or a population sector.

In some embodiments, the product information comprises information about at least one of (i) an item name and (ii) an item type, (iii) an item color, (iv) an item style, and (v) an item category.

In some embodiments, the identifying features further comprise unique identifiers corresponding to each of the one or more identifying features. In some embodiments, the identifying features comprise a quick release (QR) code or a bar code. In some embodiments, the identifying features comprise an image with one or more one-dimensional features. In some embodiments, the identifying features comprise an image with one or more two-dimensional features. In some embodiments, the identifying features comprise an image with one or more three-dimensional features. In some embodiments, the identifying features are affixed to the one or more items. In some embodiments, the identifying features are printed on a portion of the one or more items.

In some embodiments, registering the identifying features with the one or more initial consumers comprises associating the identifying features with an account, a profile, or an identity of the one or more initial consumers so that the one or more initial consumers receive one or more rewards, incentives, or benefits when (i) the identifying features are scanned by the one or more subsequent consumers, or (ii) the one or more subsequent consumers purchase an item after scanning the identifying features.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
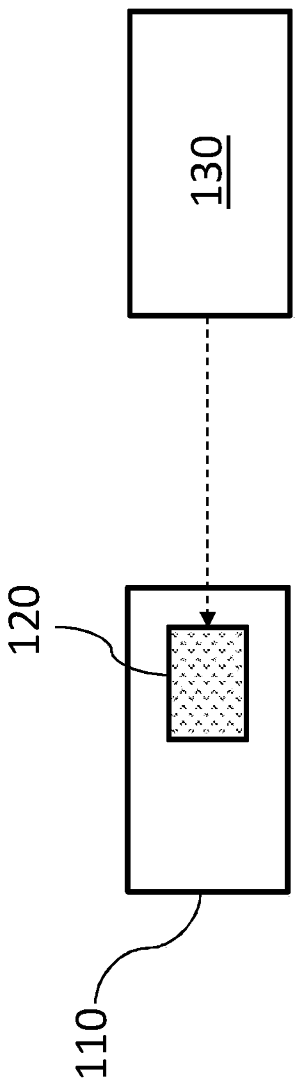
FIG. 1 schematically illustrates an identifying feature associated with an item, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

Items

In an aspect, the present disclosure provides systems and methods for registering and tracking one or more items. As used herein, an item may refer to any product that may be purchased or used by a consumer. Examples of items may include electronics, books, medical equipment, office products, household equipment, appliances, tools, industrial and/or scientific equipment, physical media, physical copies of digital media, musical instruments, sports equipment, vehicles, edible materials, clothing, apparel, and/or any other kind of physical, tangible good that may be purchased by a consumer. The term "item(s)" may further refer to a collection and/or a combination of one or more items. As used herein, the term "item(s)" may be used interchangeably with the term "product(s)."

In some cases, the items referred to herein may comprise one or more articles of clothing and/or one or more fashion accessories that may be purchasable or wearable by a consumer. The one or more articles of clothing may comprise clothing such as pants, jeans, leggings, shorts, dresses, skirts, tops, shirts, blouses, undergarments, sweaters, jackets, coats, and/or other garments that are wearable by a consumer. The one or more fashion accessories may include handbags, purses, belts, shoes, scarves, ties, jewelry, timepieces, sunglasses, hats, and/or any other complementary articles that are wearable by a consumer.

As described above, an item may comprise any product or physical, tangible good that may be purchased or used by a consumer. As used herein, a consumer may refer to any person, company or organization that is a customer or potential customer of another person, company or organization. A consumer may comprise any person, company, or organization that has purchased or will purchase one or more item from another person, company or organization. A consumer may comprise any person, company, or organization that has used or will use one or more items or products for personal and/or commercial purposes.

Identifying Feature

In one aspect, the present disclosure provides a method for registering and tracking items. The one or more items may be registered and/or tracked using an identifying feature. As used herein, an identifying feature may comprise a visual feature that corresponds to a particular item. In some cases, the visual feature may comprise a feature that is readable by a human, a sensor, or an imaging device. The visual feature may be visible to the human eye. Alternatively, the visual feature may be invisible to the human eye, but may be optically read or scanned using an imaging sensor or imaging device.

In some cases, the identifying feature may comprise a machine-readable tag attached to an item. The tag may include any type of machine-readable mechanism for representing information such as, a one, two, or three-dimensional bar code, a matrix barcode (e.g., quick response (QR) Code), a radio frequency identification (RFID) tag, a near field communication (NFC) tag, and the like. The tag may encode information representing the item such as a product number for the item.

In some cases, the identifying feature may comprise barcodes and/or quick response (QR) codes. Barcodes may define a version, a type, a serial number, or any other characteristic or parameter associated with an item that may be determined after scanning or decoding of the barcode. QR codes may comprise two-dimensional barcodes that use dark and light modules arranged in a shape (e.g., a square) to encode data such that the data may be optically captured, processed, and read by a machine. Various types of information can be encoded in barcodes or QR codes in any type of suitable format, such as binary, alphanumeric, etc. A QR code can be based on any number of standards. A QR code can have various symbol sizes, as long as the QR code can be scanned or imaged by an imaging unit or machine reader. A QR code can be of any image format (e.g. EPS or SVG vector graphs, PNG, GIF, or JPEG raster graphics format). In some embodiments, a QR code may conform to known standards that can be read by standard QR readers. The information encoded by a QR code may be made up of four standardized types ("modes") of data (numeric, alphanumeric, byte/binary, kanji) or, through supported extensions, virtually any type of data. In some embodiments, the QR code may be proprietary such that it can be read only by the item registration and tracking systems disclosed herein.

In some cases, the identifying feature may comprise an image or a visual pattern. The image or the visual pattern may comprise one or more one-dimensional features (e.g., one or more dots. In some cases, the image or the visual pattern may comprise one or more two-dimensional features (e.g., a circle, an ellipse, an oval, or various other two-dimensional shapes having three or more sides). In some cases, the image or the visual pattern may comprise one or more three-dimensional features (e.g., raised features or protrusions). In any of the embodiments described herein, the image or the visual pattern may be configured to encode information pertaining to an item, a consumer, and/or a commercial or financial transaction involving the item or the consumer.

The identifying feature may be associated with a particular item that has been purchased by a consumer. In some cases, the identifying feature may be further associated with a consumer who has purchased the particular item. The identifying feature may be associated with the consumer who has purchased the particular item through a registration process as described elsewhere herein.

The identifying feature may comprise information relating to and/or identifying the item. Such information may be used to identify the item or any characteristics associated with the item (e.g., price, color, configuration, location of purchase, etc.) when the identifying feature is imaged or scanned. In some cases, the identifying feature may comprise information corresponding to a common product name. In some cases, the identifying feature may comprise information corresponding to a type of product, a particular product style or color, or a customized set of features or options associated with a particular product. In some cases, the identifying feature may comprise information corresponding to a unique identifier, similar to a social security number or a unique serial number for the identifying feature. The unique identifier may be used to identify one particular identifying feature among a plurality of identifying features that may have one or more similar portions or visual patterns.

In any of the systems and methods disclosed herein, a plurality of identifying features may be used for a plurality of items or products, which may be the same, similar, or different. In cases where a plurality of identifying features are used to identify the same or similar type of product, each of the plurality of identifying features may comprise one or more same or similar portions or visual patterns. Alternatively, each of the plurality of identifying features may comprise one or more different portions or visual patterns. In cases where a plurality of identifying features are used to identify different products or types of product, each of the plurality of identifying features may comprise one or more different portions or visual patterns. Alternatively, each of the plurality of identifying features may comprise one or more same or similar portions or visual patterns.

In some cases, the identifying feature may comprise a QR code. The QR code may be individualized to a certain product or a certain consumer (e.g., an initial consumer) who purchased the product. In some cases, the QR code may be individualized to the initial consumer when the initial consumer scans the identifying feature and registers or adds the identifying feature to the initial consumer's profile or account. The individualized QR code may be configured to allow a reward system to identify, recognize, and/or credit the initial consumer when one or more subsequent consumers buy an item or product after scanning the initial consumer's individualized QR code.

In cases where the QR code is not yet registered to an initial consumer, when the initial consumer scans the QR code (e.g., by using a scanner or a mobile phone camera), the initial consumer may be directed to a product landing page for the item or product that is associated with the scanned QR code. The initial consumer may then register the QR code to the initial consumer's profile or account. Once registered, the QR code may be configured to allow a reward system to identify, recognize, and/or credit the initial consumer when one or more subsequent consumers buy an item or product after scanning the initial consumer's registered QR code.

In cases where the QR code is already registered with an initial consumer, when one or more subsequent consumers scan the QR code registered to the initial consumer, the one or more subsequent consumers may be directed to a product landing page for the item or product associated with the initial consumer's registered QR code. In such cases, the product landing page may be configured to permit the one or more subsequent consumers to buy the item or product (or any variation of such item or product) after selecting a size, color, style, and/or payment method.

Sticker

In some cases, the identifying feature may be affixed to the item. For example, the identifying feature may be affixed to the item using a fastener (e.g., screws, bolts, clips, clamps, pins, rivets, etc.). In some cases, the identifying feature may be attached to the item using an adhesive. In such cases, the identifying feature may be in the form of a sticker. In some cases, the identifying feature may be printed and pasted on the item. In some cases, the identifying feature may be integrated into the item during a manufacturing or production process of the item.

In any of the embodiments described herein, the identifying feature may be assigned to, associated with, and/or affixed to an item after the item is manufactured or produced. In some cases, the identifying feature may be assigned to, associated with, and/or affixed to an item while the item is being manufactured or produced. In some cases, the identifying feature may be an individual or unique QR code that is automatically created.

FIG. 1 shows an item 110 and an identifying feature 120 that may be provided with and/or associated with the item 110. In some cases, the identifying feature 120 may be affixed to or integrated with a portion of the item 110 during a manufacturing or production process. In some cases, the identifying feature 120 may be attached to the item 110 by a consumer. As described elsewhere herein, the identifying feature 120 may comprise any code or visual pattern that encodes information about the item 110. The identifying feature 120 may be imaged and/or scanned using an imaging device 130. The imaging device 130 may comprise, for example, a camera, a video camera, or an imaging sensor. When a consumer (e.g., an initial consumer) scans the identifying feature 120 using the imaging device 130, the consumer may be directed to a product landing page through which the consumer may register the identifying feature 120 with a profile, an account, or an identity of the consumer. In some cases, when a consumer (e.g., a subsequent consumer) scans the identifying feature 120 using the imaging device 130, the consumer may be directed to a product landing page through which the consumer may customize and/or buy the item 110 or a variation of the item 110.

Figure 2:
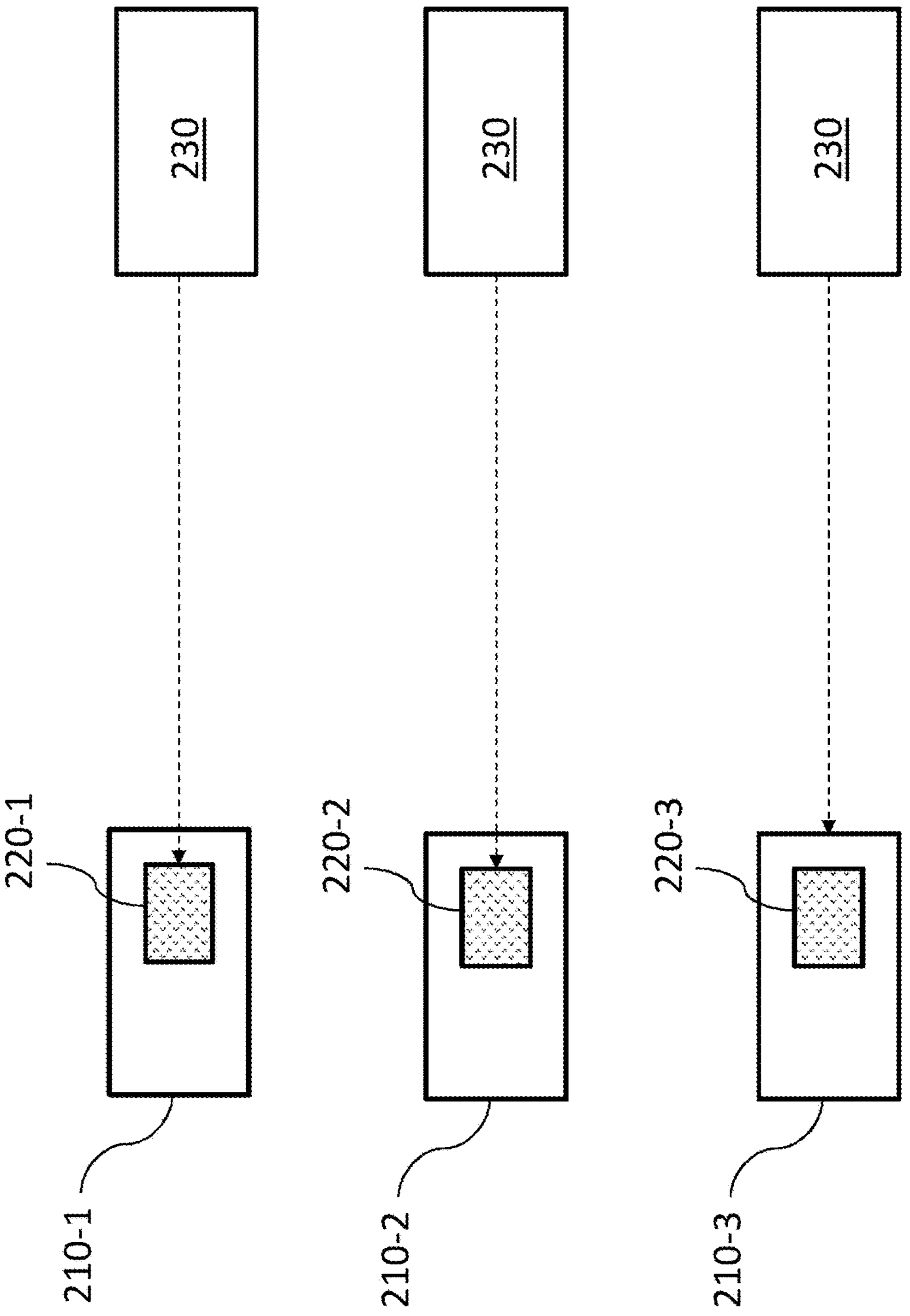
FIG. 2 schematically illustrates a plurality of identifying feature associated with a plurality of items, in accordance with some embodiments.

FIG. 2 illustrates a plurality of items 210-1, 210-2, 210-3 with a plurality of identifying features 220-1, 220-2, 220-3. In some cases, the plurality of items 210-1, 210-2, 210-3 may comprise a same or similar item. In such cases, the plurality of identifying features 220-1, 220-2, 220-3 may comprise one or more visual features that are similar or identical. Such similar or identical features may be scanned by one or more consumers using an imaging device 230, and the one or more consumers may be directed to a product landing page associated with the plurality of same or similar items. In other cases, the plurality of items 210-1, 210-2, 210-3 may comprise different items. In such cases, the plurality of identifying features 220-1, 220-2, 220-3 may comprise one or more visual features that are different or distinct. Such different or distinct features may be scanned by one or more consumers using an imaging device 230, and the one or more consumers may be directed to a product landing page associated with the plurality of different or distinct items.

Placement of Identifying Features

In some cases, the identifying feature may be placed on or integrated into a portion of the item or product. For example, the identifying feature may be placed on a sole, a heel, or a tongue of a shoe, or on an inner sleeve of a shirt or jacket. In other cases, the identifying feature may be provided with the item. For example, the identifying feature may come in a box with the item or in a separate box. In such cases, the identifying feature may be presented by the customer to other customers, or the customer may affix the identifying feature to the product themselves on a desired portion of the product.

Scanning

As described elsewhere herein, the identifying feature may be scanned using a scanning device, an imaging sensor, or an imaging device. In some cases, the identifying feature may be scanned using a mobile device. The mobile device may be a mobile phone, a notebook computer, a netbook, a tablet computer, a personal digital assistant (PDA), an e-book reader, a digital media player, or a personal gaming device. The mobile device may read the identifying feature by using a camera to take a picture of the identifying feature that is analyzed by software loaded on the mobile device to extract information from the identifying feature. Scanning the identifying feature may allow the information encoded in the identifying feature to be decoded by the scanning device. The act of scanning the identifying feature may create a link between the consumer operating the mobile device and the item or product associated with the machine-readable identifying feature. For example, the identifying feature may be scanned in order to enable one or more consumers to register the identifying feature to an identity of a consumer or a user profile or account of a consumer. In other cases, the identifying feature may be scanned in order to enable one or more consumers to view or access a product landing page through which consumers may customize and/or buy items or products.

Registration

As described above, one or more identifying features may be provided with and/or associated with one or more items or products. Initially, such identifying features may comprise information about the item or product (e.g., item or product number, or serial number, or item name, or product type). In some cases, the identifying features may not be associated with and/or registered to a particular consumer. In such cases, the initial consumer who purchases the item or product may scan the identifying feature provided with and/or associated with the item or product and register the identifying feature and/or the item or product itself to the initial consumer's account or profile. As used herein, registering an item may comprise associating the item with one or more consumers, one or more consumer accounts or profiles, or one or more commercial or financial transactions involving the item or the consumer. Once the initial consumer registers the identifying feature to his or her account, the identifying feature may be configured to identify the initial consumer or associate itself with the initial consumer's account whenever the identifying feature is scanned (e.g., by one or more subsequent consumers). In such cases, the identifying feature may be traceable to the product and the person who has purchased the product. Once the initial consumer registers the identifying feature to his or her account, the initial consumer may be eligible to receive rewards (e.g., discounts, points, coupons, incentives, etc.) when one or more subsequent consumers buy an item or product after scanning the initial consumer's registered QR code.

Web Platform

In some cases, a specific web address or website uniform resource locator (URL) may be assigned to each product type or product name. When the identifying feature is scanned, the person (e.g., a consumer) who scanned the identifying feature may be directed to a product landing page. All of the identifying features may be registered to one or more URLs that can be dynamically assigned as new products are created. In some cases, the identifying features may be registered to different URLS depending on the information encoded in the identifying features.

Figure 3:
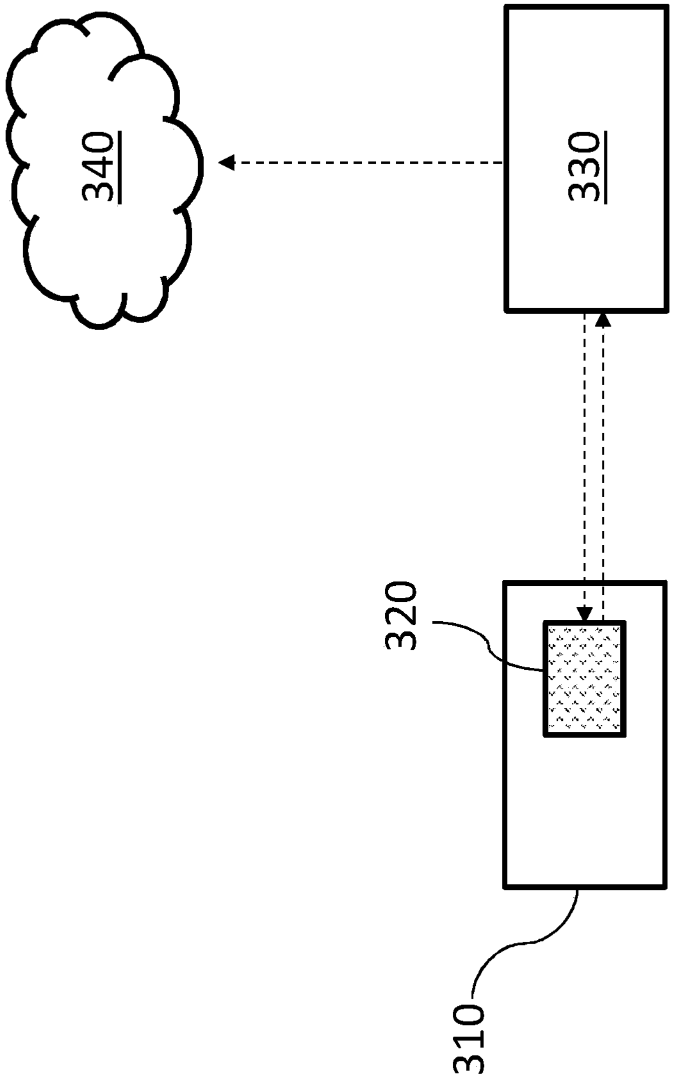
FIG. 3 schematically illustrates an online platform that may be accessed upon scanning an identifying feature associated with an item, in accordance with some embodiments.

FIG. 3 illustrates an online platform 340 that may be accessed upon scanning an identifying feature 320 associated with an item 310. When a consumer scans the identifying feature 320 using an imaging device 330, the consumer may be directed to the online platform 340 through a web browser that may be displayed on a device of the consumer. The device may comprise, for example, a mobile device such as a smartphone. In some cases, the imaging device 330 may be integrated with the consumer's device. The online platform 340 may be configured to present a consumer with an option to register the identifying feature with a profile, an account, or an identity of the consumer, if the consumer is the initial consumer who purchased or received the item. Alternatively, the online platform 340 may be configured to present a consumer with an option to customize and/or purchase the item (or a variation of the item), if the consumer is a subsequent consumer who is interested in purchasing the item after seeing a prior consumer (e.g., an initial consumer who purchased, received, and/or used the item before the subsequent consumer) using or wearing the item.

Scanning by Initial Consumer

When a consumer receives a new item, the new item may come with an identifying feature as described above. The identifying feature may not or need not be associated with the consumer at this point. The consumer (e.g., an initial consumer) may scan the identifying features associated with the new item using a camera, imaging sensor, or a scanning device (e.g., a barcode scanner). Afterwards, the new item purchased and received by the initial consumer may be registered with the consumer or the consumer's account such that the identifying feature is now associated with the initial consumer. This would allow the initial consumer to receive benefits or rewards when other subsequent consumers scan the identifying feature on the initial consumer's newly purchased item.

Scanning by Subsequent Consumers

The identifying features associated with one or more items may be scanned or imaged by using a camera, imaging sensor, or a scanning device (e.g., a barcode scanner). When scanned, a user operating the camera, imaging sensor, or scanning device may be directed to a product landing page associated with the particular type of item. The landing page may be configured to provide the user may see an image or a digital representation of the item or product. The landing page may be further configured to present the user with variations of the particular type of item (e.g., different sizes, colors, styles, etc.). The landing page may be further configured to present the user with three main call-to-action (CTA) buttons. The three main CTA buttons may comprise a registration button that permits initial consumers to register the identifying feature (such as a unique QR code) by adding the identifying feature to the initial consumer's account or profile. The three main CTA buttons may also comprise a share button that permits the user (e.g., an initial consumer or a subsequent consumer) to share the product or a link to the landing page via email, text messaging, a messaging application, etc. The three main CTA buttons may also comprise a buy button that permits the user (e.g., a subsequent consumer) to buy the item or a variation thereof after the user selects a size and color. The user may check out and purchase the item using a credit card, virtual currency, or any virtual or digital payment application. If the identifying feature scanned by a subsequent consumer is already registered to an initial consumer, the initial consumer may receive an incentive or a reward (e.g., if the subsequent consumer buys an item or product after scanning the initial consumer's registered identifying feature).

Tracking

The systems and methods of the present disclosure may be implemented using a web platform. The web platform may be configured to track the scanning and purchasing of items by consumers. The web platform may be configured to track the purchasing of items based on which sets or subsets of identifying features are scanned in order to bring consumers to the product landing pages associated with those items. For example, when an advertisement with a specific QR code for a particular product is broadcasted, the web platform may be configured to track how many people bought the particular product, or a variation thereof, based on the advertisement and the particular QR code showed within the advertisement. In some cases, a plurality of QR codes for products may be generated for a plurality of marketing campaigns specific to those products. For example, a first code can be generated for a physical advertisement of the product (e.g., product magazine, poster, catalog, postcard, etc.), a second code can be generated for a television advertisement, and a third code can be generated for an Internet web advertisement. In some cases, the plurality of QR codes may be the same or similar. In other cases, the plurality of QR codes may be different in order to differentiate between the various marketing campaigns (so that the web platform can identify which consumers bought which products after viewing which advertisements). In some cases, the plurality of QR codes may encode information about the advertiser, the item or products promoted in the advertisement, the locations in which the advertisements are posted, or the like. In another example, if one friend in a group of friends is wearing a pair of shoes, and another friend in the group of friends expresses interest in the pair of shoes or compliments the friend, the other friend can scan an identifying feature associated with or provided with the shoe (e.g., an identifying feature on a heel or a tongue portion of the shoe). In such cases, each product sold may become a digital sales enabler for new sales.

In some cases, the tracking features of the present disclosure and the data associated with such tracking features can be used to identify which demographics are buying the item, where the item is being bought, and/or which advertising channels are most effective at promoting or selling the item. In other cases, the tracking data may also be used to generate distribution maps associated with where the product is being bought and which users are influential (i.e., contributing to subsequent sales of the product). Alternatively or in addition, the tracking data may be used to promote growth, distribution, and interest in the product. Such data may be sold to retailers so that retailers can identify the most effective advertising channels, or the most influential consumers who are able to promote or market various items or products. For example, the data can be used to identify social influencers who have a large number of followers and who can advertise or showcase items or products to their followers. In some embodiments, the tracking data may also be used to track the influence of certain consumers, and the spreading or distribution of the item throughout various population sectors, geographical areas, or consumer groups.

Figure 4:
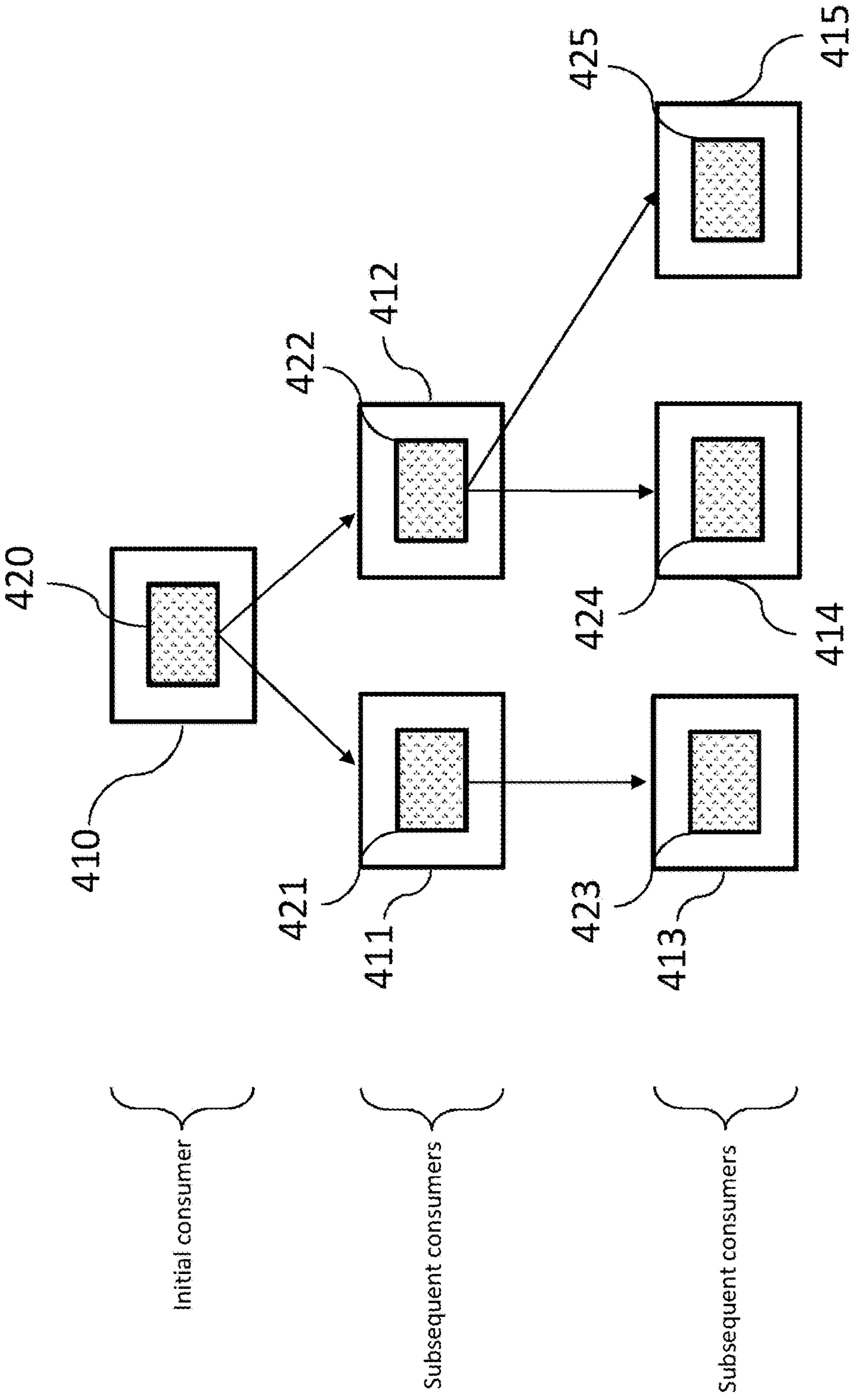
FIG. 4 schematically illustrates a network for tracking item sales based on scans of one or more identifying features, in accordance with some embodiments.

FIG. 4 illustrates a network for tracking items purchased by various consumers. The network may comprise a mapping or representation of one or more consumers who have driven sales of an item. For example, the network may identify an initial consumer who purchased or used an item 410 with a corresponding identifying feature 420. The initial consumer may register the identifying feature 420 with a profile, account, or identity of the initial consumer in order to receive rewards or benefits based on a number of subsequent scans of the identifying feature 420 by one or more subsequent consumers. A first group of subsequent consumers may scan the identifying feature 420 if they are interested in purchasing the item. If the first group of subsequent consumers purchases a same or similar item 411, 412 after scanning the identifying feature 420 associated with the item 410 purchased or used by the initial consumer, the network may identify the initial consumer as a sales driver, and the initial consumer may receive a reward or benefit.

The same or similar item 411, 412 purchased by the first group of subsequent consumers may come with identifying features 421 and 422. The identifying features 421 and 422 may be registered to an account, a profile, and/or an identity of the consumers within the first group of subsequent consumers. The identifying features 421 and 422 may be scanned by a second group of subsequent consumers if they are interested in purchasing the item. If the second group of subsequent consumers purchases a same or similar item 413, 414, and 415 after scanning the identifying features 421 and 422 associated with the items 411 and 412 purchased by the first group of subsequent consumers, the network may identify the first group of subsequent consumers as sales drivers, and the first group of subsequent consumers and/or the initial consumer may receive a reward or benefit. The items 413, 414, and 415 may have corresponding identifying features 423, 424, and 425, which may be scanned by other subsequent consumers (e.g., a third group of subsequent consumers).

The network illustrated in FIG. 4 may be used to identify certain influential consumers who are able to advertise an item effectively to other consumers and drive sales for the item. The network and the item sales tracking data associated with the network can also be used to identify which demographics are buying an item, where the item is being bought, and/or which advertising channels are most effective at promoting or selling the item. In some cases, the item sales tracking data may also be used to generate distribution maps associated with where the product is being bought and which users are influential (i.e., contributing to subsequent sales of the product). Alternatively or in addition, the item sales tracking data may be used to promote growth, distribution, and interest in the product. Such data may be sold to retailers so that retailers can identify the most effective advertising channels, or the most influential consumers who are able to promote or market various items or products. For example, the data can be used to identify social influencers who have a large number of followers and who can advertise or showcase items or products to their followers. In some embodiments, the item sales tracking data may also be used to track the influence of certain consumers, and the spreading or distribution of the item throughout various population sectors, geographical areas, or consumer groups.

Rewards

If a consumer who purchased an item (i.e., an initial consumer) registers the item (or the identifying feature associated with the item) with the consumer's profile, account, or identity, the initial customer may receive a reward whenever his or her registered identifying feature is used to drive a new sale (e.g., when another consumer purchases the item after scanning the registered identifying feature and visiting the product landing page to which he or she was directed upon scanning the initial consumer's registered identifying feature). Once the identifying feature for an item or product is registered to an initial consumer's account, the initial consumer may digitally share the registered identifying feature to any number of subsequent consumers and receive rewards if the subsequent consumers scan the identifying feature and/or buy the same or similar product after scanning the identifying feature.

In some cases, the reward may comprise a monetary award, such as cash or a virtual currency. In other cases, the reward may comprise a coupon, a voucher, a discount on future purchases, and/or a rebate for past purchases. Alternatively, the reward may comprise virtual points that are redeemable for money, other products or items, discounts, and/or special or limited edition items. In some embodiments, the reward may comprise ranking up. In such cases, when an identifying feature associated with and/or registered to a particular consumer is scanned, that consumer may rank up each time the identifying feature is scanned by another consumer (e.g., one or more subsequent consumers). In some cases, high ranking consumers can have their profiles displayed on a front page of the web platform or a ranking page showing the most successful social influencers. In some cases, high ranking consumers may earn additional rewards (e.g., any one of the rewards described herein, or any combination of such rewards).

In some cases, rewards may be accessed immediately by an initial consumer after a scanning action is performed by one or more subsequent consumers. In other cases, rewards may be accessed by the initial consumer after a predetermined period of time has passed following a scan or a purchase by one or more subsequent consumers.

Computer Systems

Figure 5:
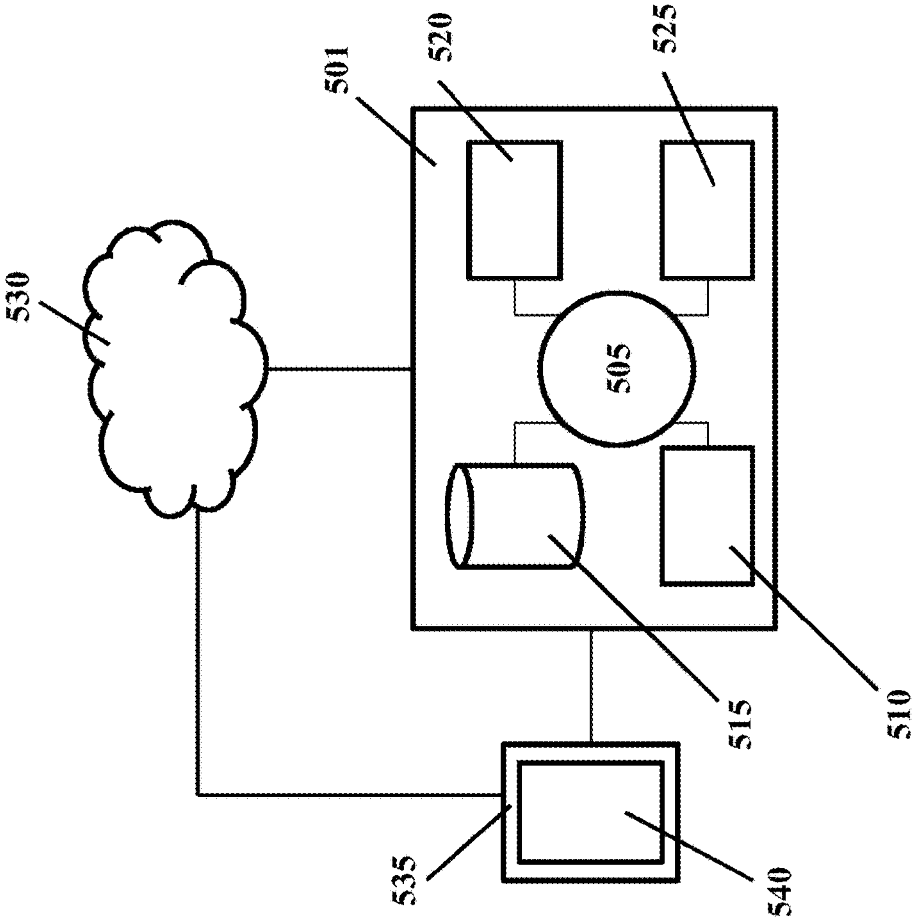
FIG. 5 schematically illustrates a computer system that is programmed or otherwise configured to implement methods provided herein.

In an aspect, the present disclosure provides computer systems that are programmed or otherwise configured to implement methods of the disclosure, e.g., any of the subject methods for registering and tracking items. FIG. 5 shows a computer system 501 that is programmed or otherwise configured to implement a method for registering and tracking items. The computer system 501 may be configured to, for example, associate an identifying feature (e.g., an identifying feature scanned by one or more subsequent consumers) with one or more initial consumers who initially purchased or received an item corresponding to the identifying feature, and to provide the one or more initial consumers with a reward or benefit based on (i) a number of times the identifying feature has been scanned, or (ii) a number of sales resulting from one or more scans of the identifying feature. The computer system 501 can be an electronic device of a user or a computer system that is remotely located with respect to the electronic device. The electronic device can be a mobile electronic device.

The computer system 501 may include a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are located external to the computer system 501 (e.g., on a remote server that is in communication with the computer system 501 through an intranet or the Internet).

The computer system 501 can communicate with one or more remote computer systems through the network 530. For instance, the computer system 501 can communicate with a remote computer system of a user (e.g., a consumer, a retailer, a manufacturer, an entity managing the online platforms described herein, etc.). Examples of remote computer systems include personal computers (e.g., portable PC), slate or tablet PC's (e.g., Apple® iPad, Samsung® Gala5 Tab), telephones, Smart phones (e.g., Apple® iphone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, a portal for a consumer to register identifying features or track rewards and benefits received, or a portal for a retailer or product manufacturer to track item sales based on consumer scans of identifying features. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. In one example, the algorithm may be configured to associate an identifying feature (e.g., an identifying feature scanned by one or more subsequent consumers) with one or more initial consumers who initially purchased or received an item corresponding to the identifying feature, and to provide the one or more initial consumers with a reward or benefit based on (i) a number of times the identifying feature has been scanned, or (ii) a number of sales resulting from one or more scans of the identifying feature.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system comprising:

an article of wearable apparel wearable by a first user, wherein the article of wearable apparel is purchased in a transaction by the first user having a social influence score;

a proprietary tag affixed to or manufactured into the article of wearable apparel, wherein the proprietary tag is configured for use by the first user using a mobile device; and a host server in communication with at least the mobile device, wherein scanning or reading the proprietary tag with the mobile device causes the host server to:

(a) load the transaction to the host server, wherein (i) the article of wearable apparel is associated with one or more identifying features determined using the proprietary tag and (ii) the proprietary tag is associated with encoded information to identify the first user, the article of wearable apparel, and the transaction;

(b) display, on mobile devices of other users by the host server, (i) the social influence score of the first user, (ii) the transaction by the first user, and (iii) the one or more identifying features of the article of wearable apparel; and (c) apply a social influence model to the first user to track the social influence score of the first user for delivering multiple benefits to the first user, wherein the social influence model is configured to process tracking data encoded into the proprietary tag to determine (i) the first user and (ii) a plurality of other transactions by the other users and the tracking data for each of (i) the transaction and (ii) the plurality of other transactions.

2. The system of claim 1, wherein the proprietary tag is affixed by the tag printed on the article of wearable apparel, the tag fastened to the article of wearable apparel, or the tag adhered to the article of wearable apparel.

3. The system of claim 1, wherein the proprietary tag is manufactured into the article of wearable apparel during production of the article of wearable apparel.

4. The system of claim 1, wherein the proprietary tag comprises a proprietary image of one-dimensional features, two-dimensional features, or three-dimensional features.

5. The system of claim 4, wherein the proprietary image is affixed to or manufactured into the article of wearable apparel to be visible to or readable by the first user or the other users.

6. The system of claim 4, wherein the proprietary image is affixed to or manufactured into the article of wearable apparel to be invisible to or unreadable by the first user or the other users.

7. The system of claim 1, wherein the proprietary tag is scannable or readable using a camera, an imaging sensor, or a scanning device.

8. The system of claim 7, wherein the mobile device of the first user or the mobile devices of the other users are configured with the camera, the imaging sensor, or the scanning device.

9. The system of claim 1, wherein the article of wearable apparel comprises an article of clothing comprising a pair of pants, a pair of jeans, a pair of leggings, a pair of shorts, a dress, a skirt, a top, a shirt, a blouse, an undergarment, a sweater, a jacket, a coat, or a garment wearable by the first user or the other users.

10. The system of claim 9, wherein the proprietary tag is affixed to or manufactured into an inner portion or an outer portion of the pair of pants, the pair of jeans, the pair of leggings, the pair of shorts, the dress, the skirt, the top, the shirt, the blouse, the undergarment, the sweater, the jacket, the coat, or the garment wearable by the first user or the other users.

11. The system of claim 1, wherein the article of wearable apparel comprises a fashion accessory comprising a handbag, a purse, a belt, a shoe, a pair of shoes, a scarf, a tie, a jewelry piece, a time piece, a pair of sunglasses, a hat, or a complementary accessory to the article of clothing wearable by the first user or the other users.

12. The system of claim 11, wherein the proprietary tag is affixed to or manufactured into an inner portion or an outer portion of the handbag, the purse, the belt, the shoe, the pair of shoes, the scarf, the tie, the jewelry piece, the time piece, the pair of sunglasses, the hat, or the complementary accessory to the article of clothing wearable by the first user or the other users.

13. The system of claim 11, wherein the proprietary tag is affixed to or manufactured into a sole of the shoe or the pair of shoes, a heel of the shoe or the pair of shoes, or a tongue of the shoe or the pair of shoes.

14. The system of claim 1, wherein the tracking data comprises (i) data associated with the article of wearable apparel, (ii) data associated with the transaction, (iii) data associated with the plurality of other transactions, (iv) a first geographical area of the transaction, and (v) one or more geographical areas of the plurality of other transactions.

15. The system of claim 1, wherein the tracking data comprises demographic data associated with one or more population sectors.

16. The system of claim 1, wherein the host server is further configured to load the plurality of other transactions by the other users to the host server, and wherein the plurality of other transactions is determined by scanning or reading the proprietary tag by the other users using mobile devices of the other users in communication with the host server.

17. The system of claim 1, wherein the host server is further configured to determine the multiple benefits, and wherein the determining is based at least on (i) the tracked social influence score of the first user and (ii) ranking up the tracked social influence score each time the proprietary tag is scanned or read by another user of the other users.

18. The system of claim 1, wherein the host server is further configured to deliver the multiple benefits to a user interface (UI) of a mobile device of the first user, and wherein the UI is configured to (i) display the multiple benefits to the first user and (ii) provide interactable elements to allow the first user to interact with the multiple benefits.

19. The system of claim 18, wherein the host server is further configured to display, on the mobile device of the first user, at least one benefit of the multiple benefits for interacting with the interactable elements of the UI by the first user.

20. The system of claim 1, wherein the host server is further configured to apply the social influence model by:

(a) analyzing a number of times the proprietary tag has been scanned or read by the other users;

(b) analyzing a number of transactions by the other users; and (c) ranking up the tracked social influence score of the first user based at least on the analyzing in (a) and (b).

* * * * *